(12) United States Patent
Wineman et al.

(10) Patent No.: US 9,298,675 B2
(45) Date of Patent: Mar. 29, 2016

(54) SMART DOCUMENT IMPORT

(75) Inventors: Mark Wineman, San Diego, CA (US); Yizhen Jiang, Shanghai (CN); Dazheng Wang, Shanghai (CN)

(73) Assignee: Adobe Systems Incorporated, San Jose, CA (US)

( * ) Notice: Subject to any disclaimer, the term of this patent is extended or adjusted under 35 U.S.C. 154(b) by 1096 days.

(21) Appl. No.: 10/954,977

(22) Filed: Sep. 30, 2004

(65) Prior Publication Data

US 2014/0250368 A1    Sep. 4, 2014

(51) Int. Cl.
| G06F 17/00 | (2006.01) |
| G06F 17/21 | (2006.01) |
| G06F 17/22 | (2006.01) |
| G06F 17/24 | (2006.01) |
| G06F 17/30 | (2006.01) |
| H04N 21/431 | (2011.01) |

(52) U.S. Cl.
CPC .......... *G06F 17/211* (2013.01); *G06F 17/2229* (2013.01); *G06F 17/2264* (2013.01); *G06F 17/243* (2013.01); *G06F 17/3089* (2013.01); *H04N 21/4314* (2013.01)

(58) Field of Classification Search
CPC ............ G06F 17/2229; G06F 17/2264; G06F 17/243; G06F 17/3089; G06F 17/211; H04N 21/4314
USPC ......................................... 715/523, 513, 517
See application file for complete search history.

(56) References Cited

U.S. PATENT DOCUMENTS

| 5,893,916 | A | * | 4/1999 | Dooley ........................ 715/234 |
| 5,903,917 | A | * | 5/1999 | Douceur et al. ............. 711/201 |
| 6,047,296 | A | * | 4/2000 | Wilmott et al. ............... 715/210 |
| 6,565,609 | B1 | * | 5/2003 | Sorge et al. .................... 715/234 |
| 6,613,098 | B1 | * | 9/2003 | Sorge et al. .................... 715/503 |
| 2001/0044809 | A1 | * | 11/2001 | Parasnis et al. ............... 707/513 |
| 2002/0135621 | A1 | * | 9/2002 | Angiulo et al. ............... 345/838 |
| 2002/0174145 | A1 | * | 11/2002 | Duga et al. .................... 707/513 |
| 2003/0023637 | A1 | * | 1/2003 | Halahmi ....................... 707/523 |
| 2003/0161615 | A1 | * | 8/2003 | Tsumagari et al. ............ 386/95 |
| 2004/0221233 | A1 | * | 11/2004 | Thielen ......................... 715/530 |
| 2005/0102281 | A1 | * | 5/2005 | Takahashi ....................... 707/3 |
| 2005/0108266 | A1 | * | 5/2005 | Cao et al. ...................... 707/101 |
| 2005/0132284 | A1 | * | 6/2005 | Lloyd et al. ................... 715/517 |
| 2006/0045343 | A1 | * | 3/2006 | Tremblay et al. ............. 382/186 |

OTHER PUBLICATIONS

Meyer, "aTool—Creating Validated XML Documents on the Fly Using MS Word," SIGDOC '02 (2002).

* cited by examiner

*Primary Examiner* — Nathan Hillery
(74) *Attorney, Agent, or Firm* — Kilpatrick Townsend & Stockton LLP

(57) ABSTRACT

Legacy documents may be imported into online electronic document systems in a form in which the document is broken up into a collection discrete sub-documents. Styles are read from the legacy document and analyzed according to one or a number of factors, such as number of instances, combinations with other styles, and the like. Based on the analysis of the various styles, a set of styles is presented to a user to select style-based breakpoints to use in dividing the legacy document. As the system converts the legacy document from its source format into a designated target format, document managing functionality applies the selected breakpoints in the target formatted document according to the designated breakpoints. The system then generates a style sheet for the converted document including the style information for that document.

21 Claims, 4 Drawing Sheets

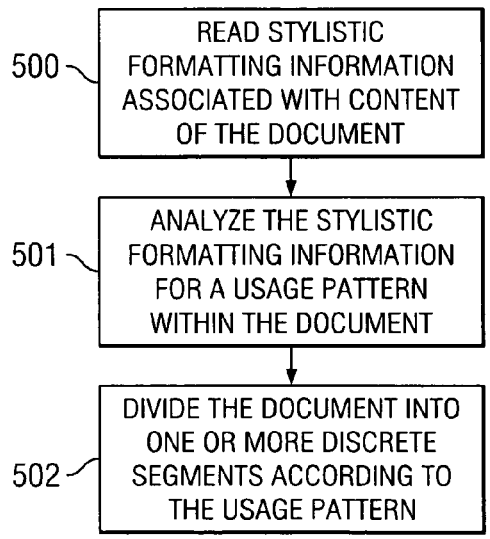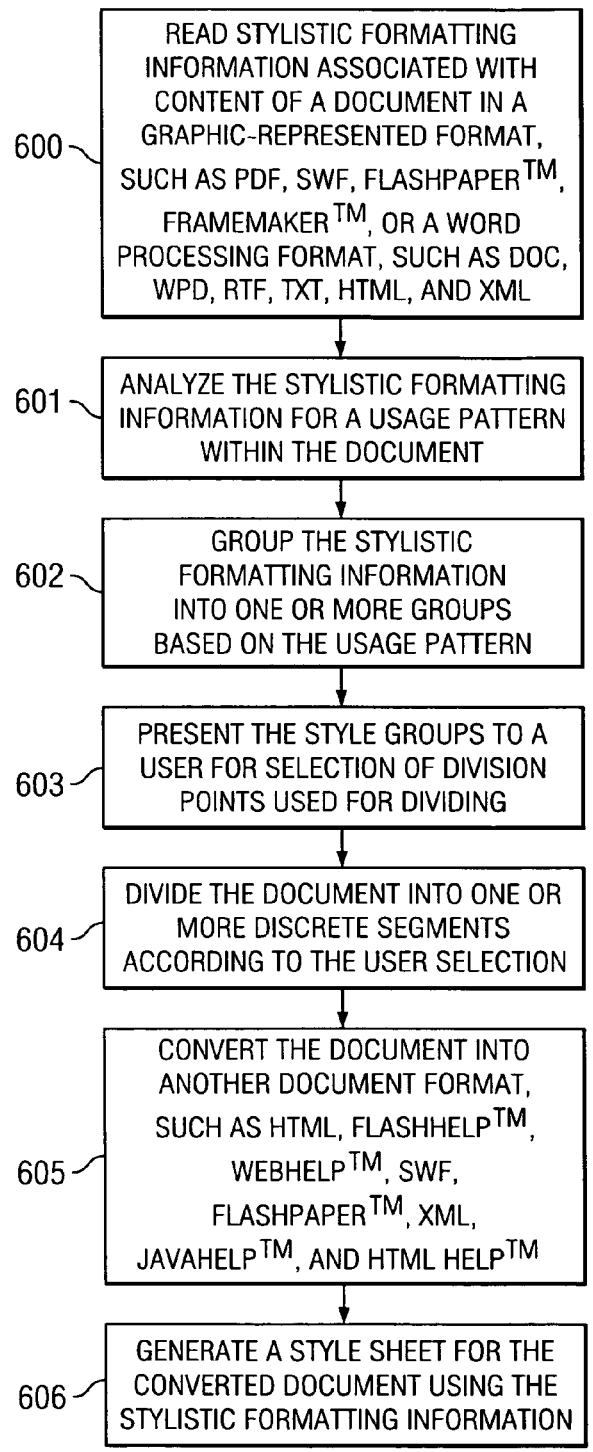

SMART DOCUMENT IMPORT

TECHNICAL FIELD

The present invention relates, in general, to electronic document systems, and, more specifically, to a system and method for smart document importation.

BACKGROUND OF THE INVENTION

Individuals, schools, small and large companies all produce a tremendous amount of documentation whether for personal view or public dissemination. Companies may have product manuals that accompany its products or employee handbooks for its employees. Schools may have course catalogs directed to students or graduate-level theses for publication to the public at large. Historically, these documents were maintained in a hard copy format stored in one or a number of locations for people to review when needed. However, with the growth of local and wide area networking, many companies recognized the value of converting paper documents into electronic documents. Electronic document systems were developed that managed large numbers of electronic documents that were converted from the hard copies.

Many of these documents may originally have been created with a word processor application, such as MICROSOFT CORPORATION's MS WORD™, COREL CORPORATION's WORDPERFECT™, or the like. When placed onto the electronic system, the documents may be in the original word processing format, such as MSWORD™ DOC, WORDPERFECT™ WPD, Rich Text Format (RTF), or the like, or may have been converted into a graphic-represented format, such as ADOBE SYSTEMS INC.'s Portable Document Format (PDF), MACROMEDIA, INC.'s FLASHPAPER™, or the like. Graphic-represented format documents are generally more universally accessible because they typically require only a viewer or player application, such as ADOBE SYSTEMS INC.'s ACROBAT™ READER, MACROMEDIA INC.'s MACROMEDIA FLASH™ PLAYER, or the like. Thus, the graphic-represented document is viewable across any number of different platforms, as long as the platform is equipped with the appropriate player. Parties with access to a company's or school's local or wide area network were then able to view the documents on a computer screen without needing to have the hard copy or be at a location near the entity.

As the capabilities and reach of the Internet began to increase, it provided a more widely-available delivery mechanism for such electronic documentation. Instead of needing access directly to the entities' networks, parties, whether employees, students, or simply the general public, may virtually access any entity's available information from almost any Internet access point. Entities now maintain intranet and Internet locations for parties to gain access to entity documentation using standard Web browsers either while directly connected to the entity's network or via an entity-sponsored Web server. While some of the legacy documentation imported to Internet-accessible locations from the early electronic online document systems remain in a graphic-represented format, some of the legacy documentation is also being converted directly into hypertext markup language (HTML) documents that may be viewed on standard Web browsers without requiring additional format-specific viewers or players. Accessing users are then able to browse through the documentation using the familiar Web browsing navigation paradigm.

Considering all of the available legacy documentation that an entity may wish to repurpose for use with an Internet-accessible electronic document system, applications may be used for converting the legacy documentation into HTML. Converting legacy documents, whether in word processing format or graphical-represented format, into HTML is a relatively simple task that may be automated by software logic. However, converting a 100-page manual into an HTML document will generally produce a single HTML document in which the user would have to use the scroll bars to access all 100 pages. While the information in these 100 pages is all there and available to the user, the user may have difficulty traversing the manual to find the things that he or she wishes to find.

In order to address this undesirable trait, developers may generally manually break up the converted legacy documents into a collection of separate HTML page. Thus, users may navigate between the collection of Web pages that make up the entire legacy document, instead of scrolling through one, very long Web page. However, the process of manually breaking such documents into separate HTML pages is very time consuming. Developers typically go through each legacy document and mark where the document should be broken up. While this process may not take particularly long for a short document, it is extremely tedious for large documents having hundreds or even thousands of document pages. Automated systems may insert a break in a document at specified points that correspond to single HTML pages. However, this systematic approach often breaks documents illogically (i.e., breaking at the beginning of a new section or in the middle of a section as opposed to breaking on a major heading or sub-heading).

Well-formatted legacy documents may be processed by a conversion application that automatically reads and analyzes the formatting to determine the more-logical points in the document at which to break, e.g., before a major heading as opposed to just after a major heading. A legacy document may be well-formatted if it was created using standard styles from the native word processing application. However, in practice many legacy documents were created using ad hoc inline styling without consideration to creating a well-formatted document. For example, instead of selecting to apply a Heading 1 style, the author would select a large font, bold the text, make the text all capital letters, and perhaps center it on the page. The result is a document that may have a well-formatted appearance, but which attained that formatting through single, inline styling assigned by the author. Therefore, conversion applications that rely on well-formatted documents will fail to identify appropriate or logical beak points because there is an undefined style.

Another method that may be used to overcome this problem is to apply style sheet formatting, such as Cascading Style Sheets (CSS), to an HTML document and automatically break the document according to a particular rule or grouping of CSS style rules. For example, a conversion application may examine and analyze a CSS file applied to a particular HTML document and provide that HTML page breaks should occur before major headings, which may be stylized as a Heading 1 in HTML. Thus, when the page-break logic encounters a major heading, it will break the HTML document into a new HTML page.

Using such style sheets for page division works only when the style sheet exists for the HTML document. If one does not already exist, a developer may convert a word processing document into an HTML document and then create a style sheet document to apply to the converted HTML. However, such a development process is typically very time intensive.

Therefore, if no style sheets exist to leverage against or the legacy document is not well-formatted, a developer may either manually divide the legacy document, divide it by page size only, or some combination of the two, none of which are a desirable process.

BRIEF SUMMARY OF THE INVENTION

The present invention is directed to a system and method for importing legacy documents into online electronic document systems. The legacy document to be imported is processed by logic which reads the style formatting contained within the legacy document. The style information may be standard styles, style sheets, inline styles, and the like. The inline styles are analyzed according to a number of factors, including which other styles appear along with the instant inline style in an organized group, how many times the group appears within the legacy document, how many other groups of associated inline styles appear in the legacy document, how the various groups or collections of inline styles compare against known standard formatting styles, and the like. A list of the style groupings, which includes the inline style groups as well as other style information, may be compiled based on the analysis of the available style information and presented to the user for selection of one or more of the style groupings to use in making the breaks in the converted or imported legacy document.

Additional or alternative embodiments of the present invention may also develop a set of rules based on the analysis of the various inline styles along with the other available style information for automatically designating points within the legacy document that may be broken into discrete document segments. As the system converts the legacy document from its source format into a designated target format, document managing functionality applies breakpoints in the target formatted document according to the designated breakpoints.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 5 is a flowchart illustrating example steps executed in implementing one embodiment of the present invention;

FIG. 6 is a flowchart illustrating example steps executed in implementing another embodiment of the present invention.

DETAILED DESCRIPTION OF THE INVENTION

Figure 1:
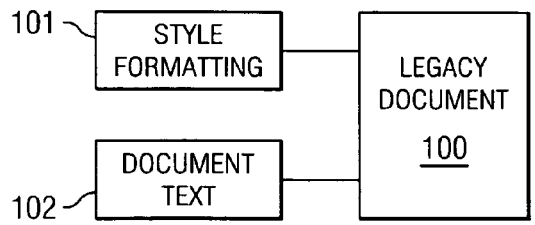
FIG. 1 is a block diagram illustrating a typical formatted legacy document.

FIG. 1 is a block diagram illustrating typical formatted legacy document 100. Legacy document 100 may be any various number of different document types, such as simple text (TXT), an MS WORD™ DOC file, a WORDPERFECT™ WPD file, an RTF file, or the like. Typically, legacy document 100 includes a pure text part, document text 102, and some additional meta information that controls the formatting of the document, style formatting 101. When legacy document 100 is properly displayed, the combination of style formatting 101 and document text 102 create the visual document as rendered to the viewing user.

Figure 2:
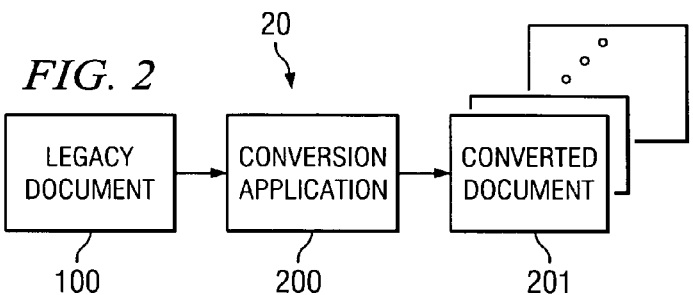
FIG. 2 is a block diagram illustrating a document import system configured according to one embodiment of the present invention.

FIG. 2 is a block diagram illustrating document import system 20 configured according to one embodiment of the present invention. Conversion application 200 processes legacy document 100 into converted document 201. As a part of this import process, conversion application 200 reads the style formatting of legacy document 100 and analyzes the overall format of legacy document 100. Legacy document 100 has been formatted using a combination of standard styles, inline style formatting, and style sheets. Based on the analysis of this style information, conversion application 200 provides breakpoints within the conversion stream of data from legacy document 100. These breakpoints result in converted document 201, which has the content and formatting of legacy document 100, divided such that a user may view each segment of information from legacy document 100 in a separate sub-document segment.

It should be noted that in additional and alternative embodiments of the present invention, conversion application 200 analyzes the overall formatting of legacy document 100 and compiles a list of possible style-based breakpoints for converted document 201 which is then presented to a user. Based on the selections made by the user, conversion application will divide legacy document 100 into multiple, related sub-documents.

Figure 3:
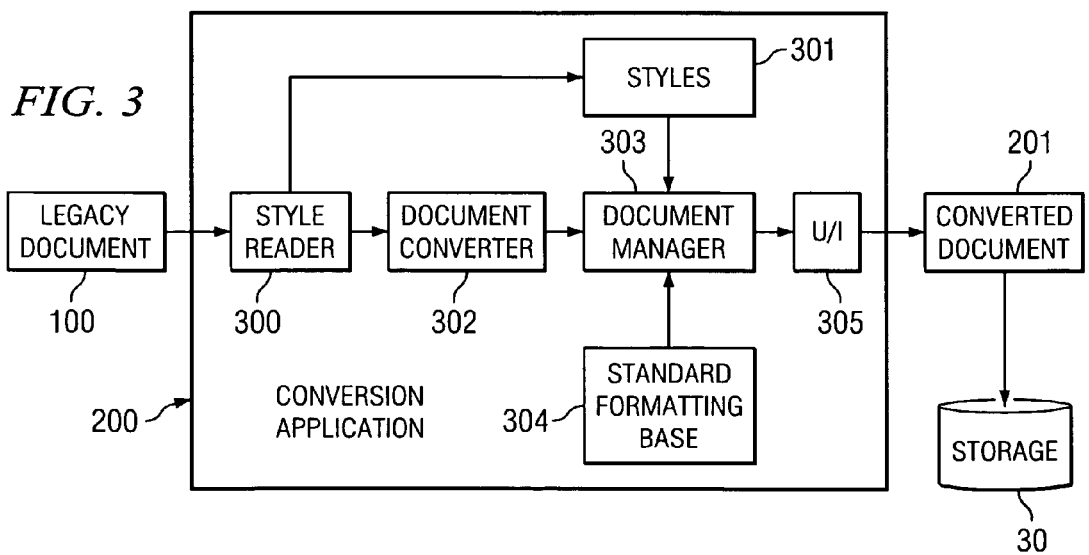
FIG. 3 is a block diagram illustrating a conversion application configured according to one embodiment of the present invention.

FIG. 3 is a block diagram illustrating conversion application 200 configured according to one embodiment of the present invention. Conversion application 200 includes style reader logic 300 which reads the various style formatting from the input data stream representing legacy document 100 and places the formatting in styles data structure 301. The style formatting may be read directly from style metadata associated with legacy document 100, e.g., style formatting 101 (FIG. 1), or may be determined by analyzing the shape and line-weighting of the document content, such as in a graphic-represented document format.

The input data stream is processed by document converter logic 302 to convert the format of legacy document 100 into the desired output format for converted document 201. For example, legacy document 100 may comprise an MS WORD™ DOC, a WORDPERFECT™ WPD, an RTF, a PDF, a SWF, a FLASHPAPER™, HTML, ADOBE SYSTEMS INC.'s FRAMEMAKER™, an extensible markup language (XML), or other such format, while the desired format of converted document 201 may comprise an HTML document, MACROMEDIA INC.'s FLASHHELP™ and WEBHELP™, a SWF, a FLASHPAPER™, an XML, SUN MICROSYSTEMS, INC's JAVAHELP™, MICROSOFT CORPORATION's HTML HELP™, or the like. Depending on which format is desired for converted document 201, the input data stream is converted into an output data stream for further processing by document manager logic 303.

Document manager logic 303 analyzes the styles from style data structure 301. Document manager logic 303 counts each instance of a particular style and, based on the total counts, matches styles that occur together into various groups of commonly-applied styles. For example, document manager logic 303 may count 100 instances of bold styling within legacy document 100. Ten of those instances of bold share ten instances of all caps, ten instances of 24 point Arial font, and 24 instances of centered text. Thirty of the other bold instances share thirty instances of italics, thirty instances of 14 point Arial font, and 30 instances of left justification having a zero indention. Document manager logic 303 groups the styles bold, all caps, 24 point Arial, and centered into a style collection. It further groups bold, italics, 14 point Arial, and left justification with zero indent into another, separate style collection. Document manager logic 303 would continue comparing and grouping the styles and standard styles or style sheet rules until certain groupings or collections have only single types of inline styles. Based on these styles and style collections, document manager logic 303 determines logical points at which legacy document 100 may be divided to create discrete segments in converted document 201.

Using the examples from above, document manager logic 303 may determine that the ten instances of the first style collection designate major headings within legacy document 100. It may then also determine that the thirty instances of the second style collection designate sub-headings within legacy document 100. Based on breaking protocols, it would be more beneficial to break legacy document 100 prior to a major heading, or, if no major heading was within the particular document segment, to break it prior to a sub-heading. Document manager logic 303 would, therefore, establish breakpoint rules for breaking the converted data stream from legacy document 100 into logical discrete segments to form converted document 201. The converted data stream with the inserted breakpoints are transmitted to user interface 305 for rendering converted document 201 to a viewer or user. The user may then view converted document 201 in the logical discrete segments. Converted document 201 may then be stored at storage 30 for loading onto a Web server or staging for review before making it available for view on the accessible Website or may simply be used in a document system that is not necessarily Web-based. Along with converted document 201, document manager logic 303 takes all of the style information obtained from the analysis of legacy document 100 and creates a single style sheet, such as a CSS style sheet, that provides all of the style formatting for converted document 201. Therefore, the haphazard styling of legacy document 100 is corrected into a well-formatted document of converted document 201.

Figure 4:
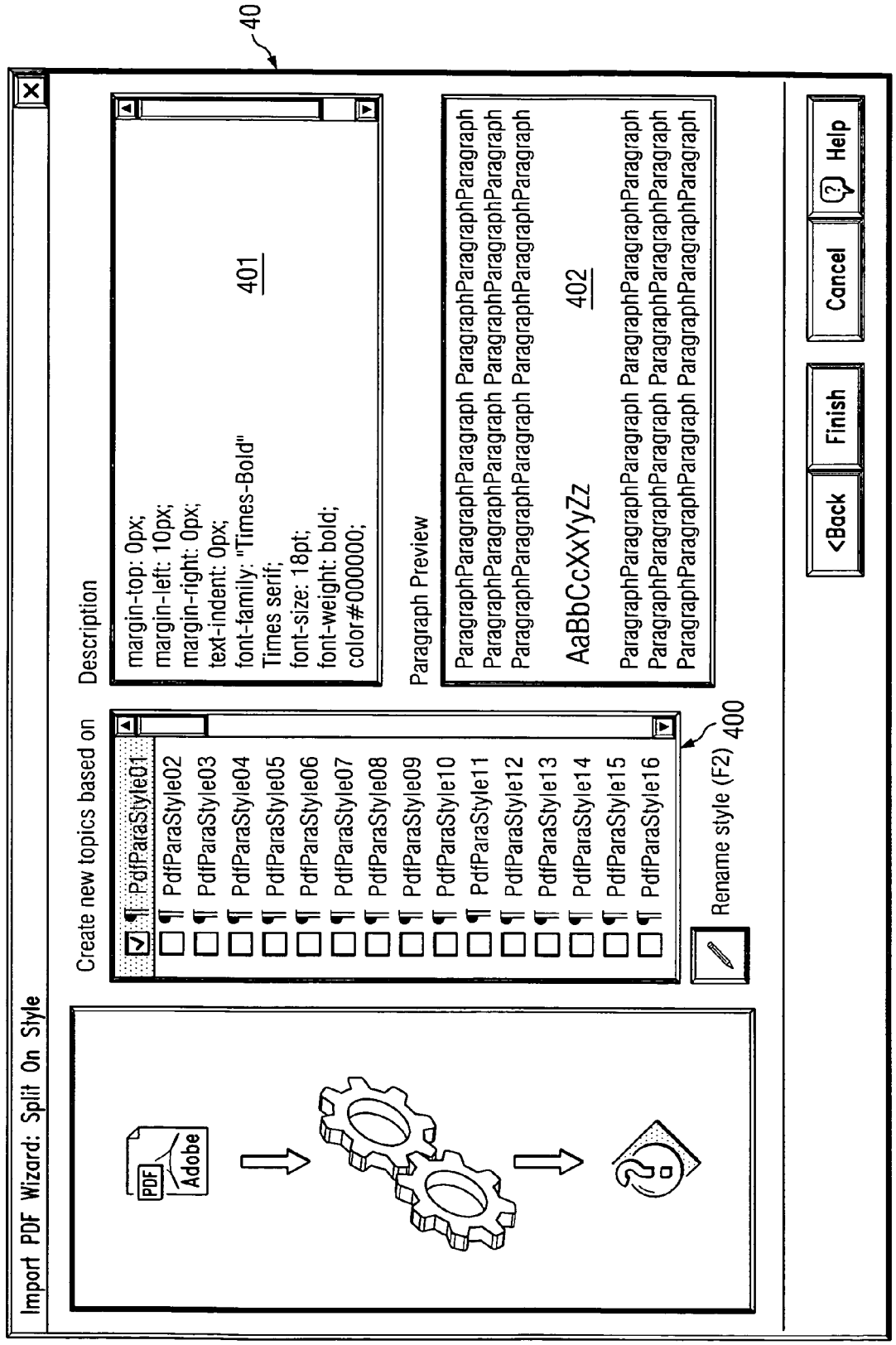
FIG. 4 is a screen shot illustrating a dialog box presented to a user of a conversion application configured according to another embodiment of the present invention.

FIG. 4 is a screen shot illustrating dialog box 40 presented to a user of a conversion application configured according to another embodiment of the present invention. As document manager logic 303 (FIG. 3) analyzes the style collections or groups, the list of such style groups may be presented for the user to select the various groups to use as rules for establishing breakpoints in the converted document. Style groups list 400 presents each of the style lists to the user with description box 401 presenting the style properties of the highlighted style group and preview box 402 showing a graphical rendition of the highlighted style group. Using this information, the user may select which style groups to use in making document-break decisions in the converted document.

It should be noted that in further additional or alternative embodiments of the present invention, document manager logic 303 may use only the instance count of the styles to determine the set of breakpoint rules to be applied to the converted data stream for legacy document 100.

FIG. 5 is a flowchart illustrating example steps executed in implementing one embodiment of the present invention. In step 500, stylistic formatting information associated with content of a document to import is read. The stylistic formatting information in analyzed, in step 501, for a usage pattern within the document. The document is then divided into one or more discrete segments according to the usage pattern in step 502.

FIG. 6 is a flowchart illustrating example steps executed in implementing another embodiment of the present invention. In step 600, stylistic formatting information is read from a document to be imported, wherein the document is in a graphic-represented format, such as PDF, SWF, FLASHPAPER™, FRAMEMAKER™, or a word processing format, such as DOC, WPD, RTF, TXT, HTML, and XML. The stylistic formatting information is then analyzed, in step 601, for a usage pattern within the document. The stylistic formatting information is then grouped into one or more groups based on the usage pattern in step 602. The one or more style groups are presented to a user, in step 603, for selecting division points used for dividing the document into discrete sub-documents. In step 604, the document is divided into one or more discrete sub-documents according to the user's selections. In step 605, the document is then converted into another document format, such as HTML, FLASHHELP™, WEBHELP™, SWF, FLASHPAPER™, XML, JAVAHELP™, and HTML HELP™. The stylistic formatting information is then used in step 606, to generate a style sheet for the converted document. Thus, a well-formatted document is created in the conversion.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 7:
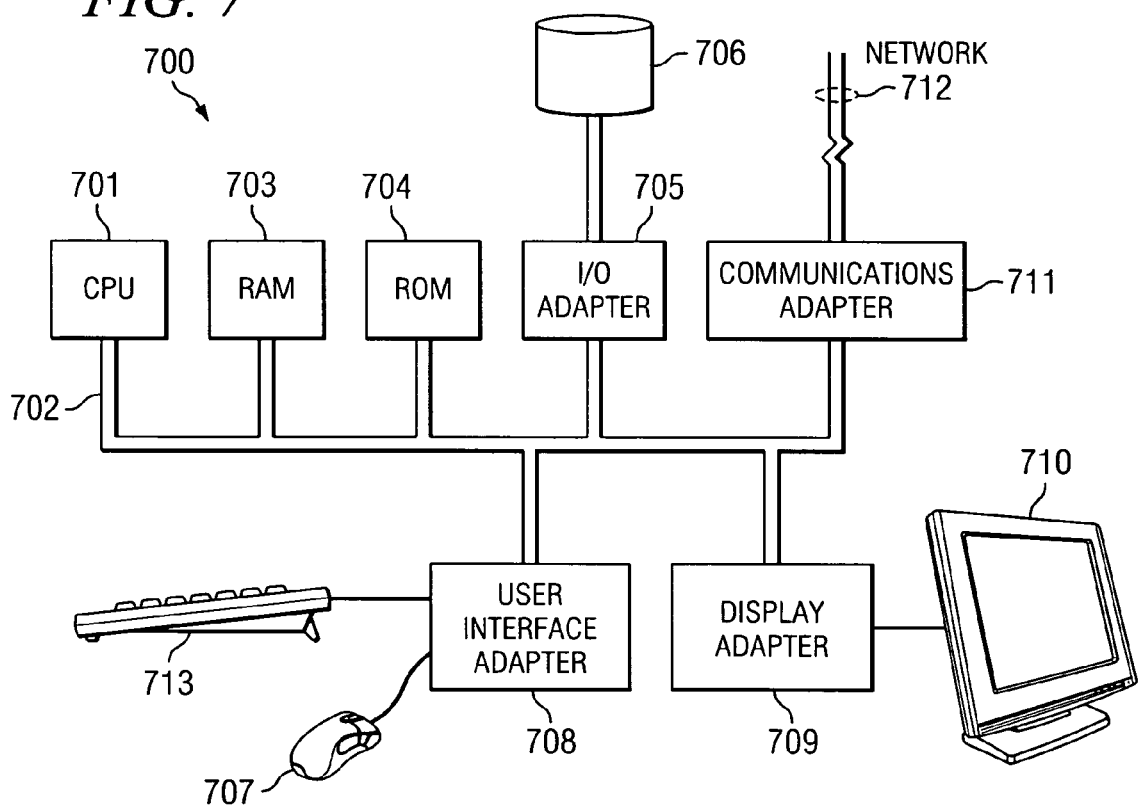
FIG. 7 illustrates a computer system adapted to use embodiments of the present invention.

FIG. 7 illustrates computer system 700 adapted to use embodiments of the present invention, e.g. storing and/or executing software associated with the embodiments. Central processing unit (CPU) 701 is coupled to system bus 702. The CPU 701 may be any general purpose CPU. However, embodiments of the present invention are not restricted by the architecture of CPU 701 as long as CPU 701 supports the inventive operations as described herein. Bus 702 is coupled to random access memory (RAM) 703, which may be SRAM, DRAM, or SDRAM. ROM 704 is also coupled to bus 702, which may be PROM, EPROM, or EEPROM. RAM 703 and ROM 704 hold user and system data and programs as is well known in the art.

Bus 702 is also coupled to input/output (I/O) controller card 705, communications adapter card 711, user interface card 708, and display card 709. The I/O adapter card 705 connects storage devices 706, such as one or more of a hard drive, a CD drive, a floppy disk drive, a tape drive, to computer system 700. The I/O adapter 705 is also connected to a printer (not shown), which would allow the system to print paper copies of information such as documents, photographs, articles, etcetera. Note that the printer may be a printer (e.g. dot matrix, laser, etcetera.), a fax machine, scanner, or a copier machine. Communications card 711 is adapted to couple the computer system 700 to a network 712, which may be one or more of a telephone network, a local (LAN) and/or a wide-area (WAN) network, an Ethernet network, and/or the Internet network. User interface card 708 couples user input devices, such as keyboard 713, pointing device 707, etcetera to the computer system 700. The display card 709 is driven by CPU 701 to control the display on display device 710.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method performed by a document conversion application for importing a document into an electronic document system, the document conversion application executed by a computing device comprising a processor, the method comprising:
    analyzing, via the processor, in an input data stream representing a document in a first document format, document formatting to determine a plurality of inline styles applied to text of said document using inline style formatting;
    adding, via the processor, each of the detected inline styles to a styles data structure stored in a memory accessible to the document conversion application;
    converting, via the processor, the input data stream into an output data stream representing the document in a second document format;
    analyzing, via the processor, the styles data structure to identify each instance of a particular inline style and match the inline styles that occur together in the document into a plurality of groupings of inline styles that are commonly applied to different portions of the text, wherein the plurality of groupings of inline styles correspond to formatting patterns applied to the different portions of the text;
    determining, via the processor, that a first subset of the groupings of inline styles designates major headings within the document and a second subset of the groupings of inline styles designates sub-headings within the document;
    inserting breakpoints into said output data stream, via the processor, according to a breaking protocol, wherein the breaking protocol specifies that each breakpoint is inserted into the output data stream at a location prior to an occurrence of a major heading within a particular segment of the document, or, if no major heading occurs within the segment, prior to a sub-heading, wherein insertion of said breakpoints divides said document into a plurality of discrete sub-documents each in said second document format; and
    after insertion of said breakpoints, storing, via the processor, the output data stream in a storage device.

2. The method of claim 1 further comprising:
    generating, via the processor, a style sheet for said document in said second document format, said style sheet comprising each of the detected inline styles.

3. The method of claim 1 wherein said first document format comprises one of:
    a graphic-represented format; and
    a word processing format.

4. The method of claim 1 wherein said first document format comprises one of:
    simple text (TXT);
    MS WORD™ DOC;
    WORDPERFECT™ WPD;
    rich text format (RTF);
    portable document format (PDF);
    small web file (SWF);
    FLASHPAPER™;
    hypertext markup language (HTML);
    FRAMEMAKER™; and
    extensible markup language (XML).

5. The method of claim 1 wherein said second document format comprises one of:
    HTML;
    FLASHHELP™;
    WEBHELP™;
    SWF;
    FLASHPAPER™;
    XML;
    JAVAHELP™; and
    HTML HELP™.

6. The method of claim 1 further comprising:
    presenting, via the processor, said plurality of groupings of inline styles to a user and receiving one or more selections of the groupings; and
    wherein additional breakpoints are inserted into the output data stream at locations prior to each occurrence of one of the selected groupings of inline styles.

7. The method of claim 1 further comprising:
    presenting, via the processor, said plurality of groupings of inline styles to a user and receiving one or more selections of the groupings;
    determining, via the processor, one or more breakpoint rules based at least in part on said one or more selections made by said user, wherein additional breakpoints are inserted into the output data stream according to said one or more breakpoint rules.

8. The method of claim 7 wherein presenting said plurality of groupings of inline styles to the user comprises: presenting a list of said groupings of inline styles on a display screen; and rendering on said display screen a representation of each of said groupings of inline styles applied to sample text.

9. The method of claim 1, wherein determining that the first subset of the groupings of inline styles designates major headings and the second subset of the groupings of inline styles designates sub-headings comprises analyzing each of the plurality of groupings of inline styles; and
    wherein each analyzed grouping of inline styles is analyzed according to factors comprising: other inline styles that appear along with a particular inline style in the analyzed grouping of inline styles, how many times the analyzed grouping of inline styles appears within the document, how many other groupings of associated inline styles appear in the document, how the analyzed grouping of inline styles compares against known standard formatting styles.

10. A nontransitory computer readable medium with computer program logic recorded thereon for execution by a processor of a computer system when importing a document into an electronic document system, wherein the program logic is executable by the processor to cause:
    analyzing in an input data stream representing a document in a first document format, document formatting to determine a plurality of inline styles applied to text of said document using inline style formatting;
    adding each of the detected inline styles to a styles data structure stored in a memory accessible to the document conversion application;
    converting the input data stream into an output data stream representing the document in a second document format;
    analyzing the styles data structure to identify each instance of a particular inline style and match the inline styles that occur together in the document into a plurality of groupings of inline styles that are commonly applied to different portions of the text, wherein the plurality of groupings of inline styles correspond to formatting patterns applied to the different portions of the text;
    determining that a first subset of the groupings of inline styles designates major headings within the document and a second subset of the groupings of inline styles designates sub-headings within the document;
    inserting breakpoints into said output data stream, according to a breaking protocol, wherein the breaking protocol specifies that each breakpoint is inserted into the output data stream at a location prior to an occurrence of a major heading within a particular segment of the document, or, if no major heading occurs within the segment, prior to a sub-heading, wherein insertion of said breakpoints divides said document into a plurality of discrete sub-documents each in said second document format; and
    after insertion of said breakpoints, storing the output data stream in a storage device.

11. The nontransitory computer readable medium of claim 10 wherein the program logic is further executable by the processor to cause:
    generating a style sheet for said document in said second document format, said style sheet comprising each of said detected inline styles.

12. The nontransitory computer readable medium of claim 10 wherein said first document format comprises one of:
    simple text (TXT);
    MS WORD™ DOC;
    WORDPERFECT™ WPD;
    rich text format (RTF);
    portable document format (PDF);
    small web file (SWF);
    FLASHPAPER™;
    hypertext markup language (HTML);
    FRAMEMAKER™; and
    extensible markup language (XML).

13. The nontransitory computer readable medium of claim 10 wherein said second document format comprises one of:
    HTML;
    FLASHHELP™;
    WEBHELP™;
    SWF;
    FLASHPAPER™;
    XML;
    JAVAHELP™;
    and HTML HELP™.

14. The nontransitory computer readable medium of claim 10, wherein the program logic is further executable by the processor to cause:
    presenting said plurality of groupings of inline styles to a user; and
    receiving one or more selections of the groupings, wherein additional breakpoints are inserted into the output data stream at locations prior to each occurrence of one of the selected groupings of inline styles.

15. The nontransitory computer readable medium of claim 14 wherein presenting said plurality of groupings of inline styles to the user comprises: presenting a list of said groupings of inline styles on a display screen; and rendering on said display screen a representation of said each of said groupings of inline styles applied to sample text.

16. The nontransitory computer readable medium of claim 10, wherein determining that the first subset of the groupings of inline styles designates major headings and the second subset of the groupings of inline styles designates sub-headings comprises analyzing each of the plurality of groupings of inline styles; and
    wherein each analyzed grouping of inline styles is analyzed according to factors comprising: other inline styles that appear along with a particular inline style in the analyzed grouping of inline styles, how many times the analyzed grouping of inline styles appears within the document, how many other groupings of associated inline styles appear in the document, how the analyzed grouping of inline styles compares against known standard formatting styles.

17. A computer system comprising:
    a processor; and
    a memory storing program instructions of a document conversion application, the program instructions executable by the processor to perform operations comprising:
    analyzing in an input data stream representing the document in a first document format, document formatting to determine a plurality of inline styles applied to text of said document, wherein the inline styles comprise at least one of a font type, a font size, bold text, italicized text, underlined text, and capitalized text, and wherein the inline styles are applied to the text using inline style formatting;
    adding each of the detected inline styles to a styles data structure stored in a memory accessible to the document conversion application;
    converting the input data stream into an output data stream representing the document in a second document format;

analyzing the styles data structure to identify each instance of a particular inline style and match the inline styles that occur together in the document into a plurality of groupings of inline styles that are commonly applied to different portions of the text, wherein the plurality of groupings of inline styles correspond to formatting patterns applied to the different portions of the text;

determining that a first subset of the groupings of inline styles designates major headings within the document and a second subset of the groupings of inline styles designates sub-headings within the document;

inserting breakpoints into said output data stream, according to a breaking protocol, wherein the breaking protocol specifies that each breakpoint is inserted into the output data stream at a location prior to an occurrence of a major heading within a particular segment of the document, or, if no major heading occurs within the segment, prior to a sub-heading, wherein insertion of said breakpoints divides said document into a plurality of discrete sub-documents each in said second document format; and after insertion of said breakpoints, storing the output data stream in a storage device.

18. The system of claim 17, wherein the program instructions further cause the computer system to generate a style sheet for said document in said second document format, said style sheet comprising each of the detected inline styles.

19. The system of claim 17 wherein said first document format comprises one of:
simple text (TXT);
MS WORD™ DOC;
WORDPERFECT™ WPD;
rich text format (RTF);
portable document format (PDF);
small web file (SWF);
FLASHPAPER™;
hypertext markup language (HTML);
FRAMEMAKER™; and
extensible markup language (XML).

20. The system of claim 17 wherein said second document format comprises one of:
HTML;
FLASHHELP™;
WEBHELP™;
SWF;
FLASHPAPER™;
XML;
JAVAHELP™; and
HTML HELP™.

21. The system of claim 17, wherein determining that the first subset of the groupings of inline styles designates major headings and the second subset of the groupings of inline styles designates sub-headings comprises analyzing each of the plurality of groupings of inline styles; and wherein each analyzed grouping of inline styles is analyzed according to factors comprising: other inline styles that appear along with a particular inline style in the analyzed grouping of inline styles, how many times the analyzed grouping of inline styles appears within the document, how many other groupings of associated inline styles appear in the document, how the analyzed grouping of inline styles compares against known standard formatting styles.

* * * * *